United States Patent
Kim et al.

(10) Patent No.: US 11,553,550 B2
(45) Date of Patent: Jan. 10, 2023

(54) METHOD AND APPARATUS FOR SUPPORTING SECURITY IN RRC INACTIVE STATE IN WIRELESS COMMUNICATION SYSTEM

(71) Applicant: LG Electronics Inc., Seoul (KR)

(72) Inventors: Taehun Kim, Seoul (KR); Bokyung Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 16/502,493

(22) Filed: Jul. 3, 2019

(65) Prior Publication Data

US 2020/0015074 A1 Jan. 9, 2020

Related U.S. Application Data

(60) Provisional application No. 62/693,985, filed on Jul. 4, 2018.

(51) Int. Cl.
*H04W 12/00* (2021.01)
*H04W 76/27* (2018.01)
*H04W 12/30* (2021.01)

(52) U.S. Cl.
CPC .......... *H04W 76/27* (2018.02); *H04W 12/30* (2021.01)

(58) Field of Classification Search
CPC .............................. H04W 12/30; H04W 76/27
See application file for complete search history.

(56) References Cited

U.S. PATENT DOCUMENTS

| | | | |
|---|---|---|---|
| 2017/0332419 A1* | 11/2017 | Kim | ...................... H04L 1/1887 |
| 2019/0289661 A1* | 9/2019 | Chen | ................... H04W 72/1284 |
| 2020/0214070 A1* | 7/2020 | Ingale | ............... H04W 74/0833 |
| 2020/0229111 A1* | 7/2020 | Kim | .................... H04W 52/242 |
| 2021/0250794 A1* | 8/2021 | Wei | ....................... H04B 7/0617 |

OTHER PUBLICATIONS

3GPP TSG SA WG3 (Security) Meeting #89, S3-173189, Nov. 27-Dec. 1, 2017, Reno, USA (Year: 2017).*

"3rd Generation Partnership Project; Technical Specification Group Services and System Aspects; Security architecture and procedures for 5G system (Release 15)", Section 6.8.2 of 3GPP TS 33.501, V15.1.0, (Jun. 2018).

* cited by examiner

*Primary Examiner* — Noura Zoubair
(74) *Attorney, Agent, or Firm* — Dentons US LLP

(57) ABSTRACT

A method and apparatus for supporting security in a radio resource control (RRC) inactive state in a wireless communication system is provided. A user equipment (UE) receives information on multiple security variables, of which each variable is mapped to each of multiple counter values, respectively. The UE calculates a security parameter and/or updating a UE identifier (ID) based on a security variable among the security variables which is mapped to a corresponding counter value among the multiple counter values, and transmits a radio resource control (RRC) resume request message including the calculated security parameter and/or the updated UE ID. The counter value may be increase whenever a timer expires or an RRC reject message is received as a response to the RRC resume request message.

15 Claims, 10 Drawing Sheets

METHOD AND APPARATUS FOR SUPPORTING SECURITY IN RRC INACTIVE STATE IN WIRELESS COMMUNICATION SYSTEM

CROSS-REFERENCE TO RELATED APPLICATIONS

Pursuant to 35 U.S.C. § 119 (e), this application claims the benefit of U.S. Provisional Application No. 62/693,985, filed on Jul. 4, 2018, the contents of which are all hereby incorporated by reference herein in their entirety.

BACKGROUND OF THE INVENTION

Field of the Invention

The present invention relates to wireless communications, and more particularly, to a method and apparatus for supporting security in a radio resource control (RRC) inactive state in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state is a new state added in 5G NR compare to 4G LTE. Motivation to use this state seems to reduce the time to bring user equipment (UE) in connected state from other states. This will increase UE battery life and latency as well because of less signaling involved. Both UE and gNB stores access stratum (AS) context in this state and bringing to RRC connected state from inactive state would not involve NAS level signaling.

SUMMARY OF THE INVENTION

To transit from RRC inactive state to RRC connected state, an RRC resume procedure may be used, in which an RRC resume request message is transmitted. For fast transit from RRC inactive state to RRC connected state, the RRC resume request message may include the stored AS context. Security regarding the AS context included the RRC resume request message should be addressed.

In an aspect, a method performed by a wireless device in a wireless communication system is provided. The method includes receiving information on multiple security variables, wherein each of the multiple security variables is mapped to each of multiple counter values, respectively, calculating a security parameter and/or updating a user equipment (UE) identifier (ID) based on a security variable among the security variables which is mapped to a counter value among the multiple counter values, and transmitting a radio resource control (RRC) resume request message including the calculated security parameter and/or the updated UE ID.

In another aspect, a wireless device in a wireless communication system is provided. The wireless device includes a memory, a transceiver, and a processor, operably coupled to the memory and the transceiver. The wireless device is configured to receive, via the transceiver, information on multiple security variables, wherein each of the multiple security variables is mapped to each of multiple counter values, respectively, calculate, via the processor, a security parameter and/or updating a user equipment (UE) identifier (ID) based on a security variable among the security variables which is mapped to a counter value among the multiple counter values, and transmit, via the transceiver, a radio resource control (RRC) resume request message including the calculated security parameter and/or the updated UE ID.

In another aspect, a processor for a wireless device in a wireless communication system is provided. The processor is configured to control the wireless device to receive information on multiple security variables, wherein each of the multiple security variables is mapped to each of multiple counter values, respectively, calculate a security parameter and/or updating a user equipment (UE) identifier (ID) based on a security variable among the security variables which is mapped to a counter value among the multiple counter values, and control the wireless device to transmit a radio resource control (RRC) resume request message including the calculated security parameter and/or the updated UE ID.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
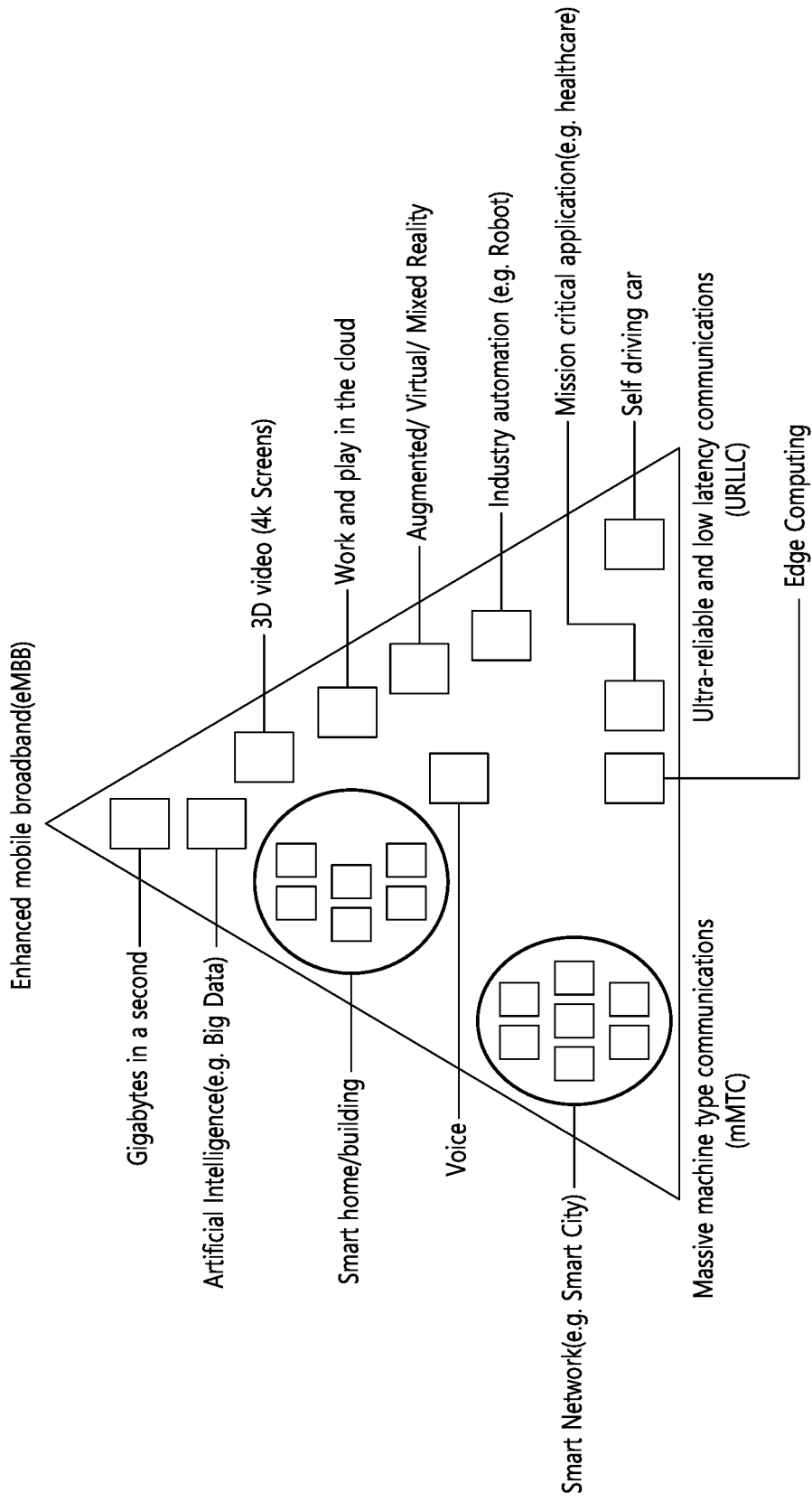
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement.

In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
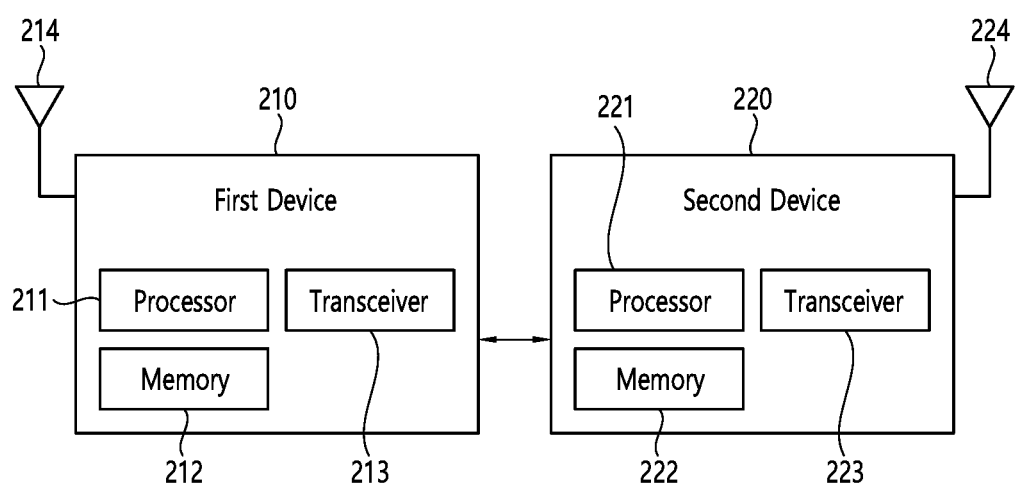
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol.

The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals. The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
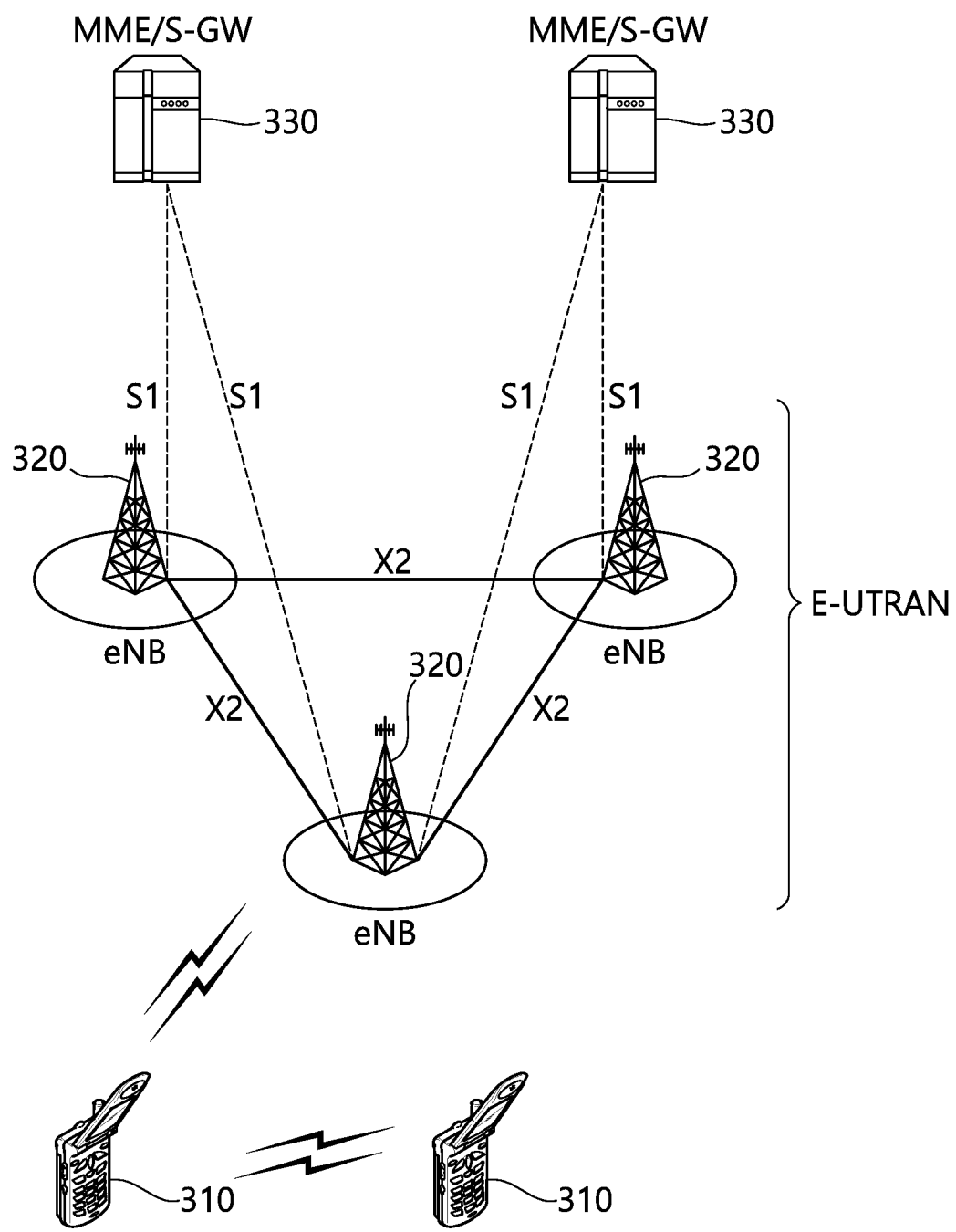
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the Si interface to the EPC, more specifically to the MME by means of the S1-MME interface and to the S-GW by means of the S1-U interface. The S1 interface supports a many-to-many relation between MMEs/S-GWs and eNBs.

Figure 4:
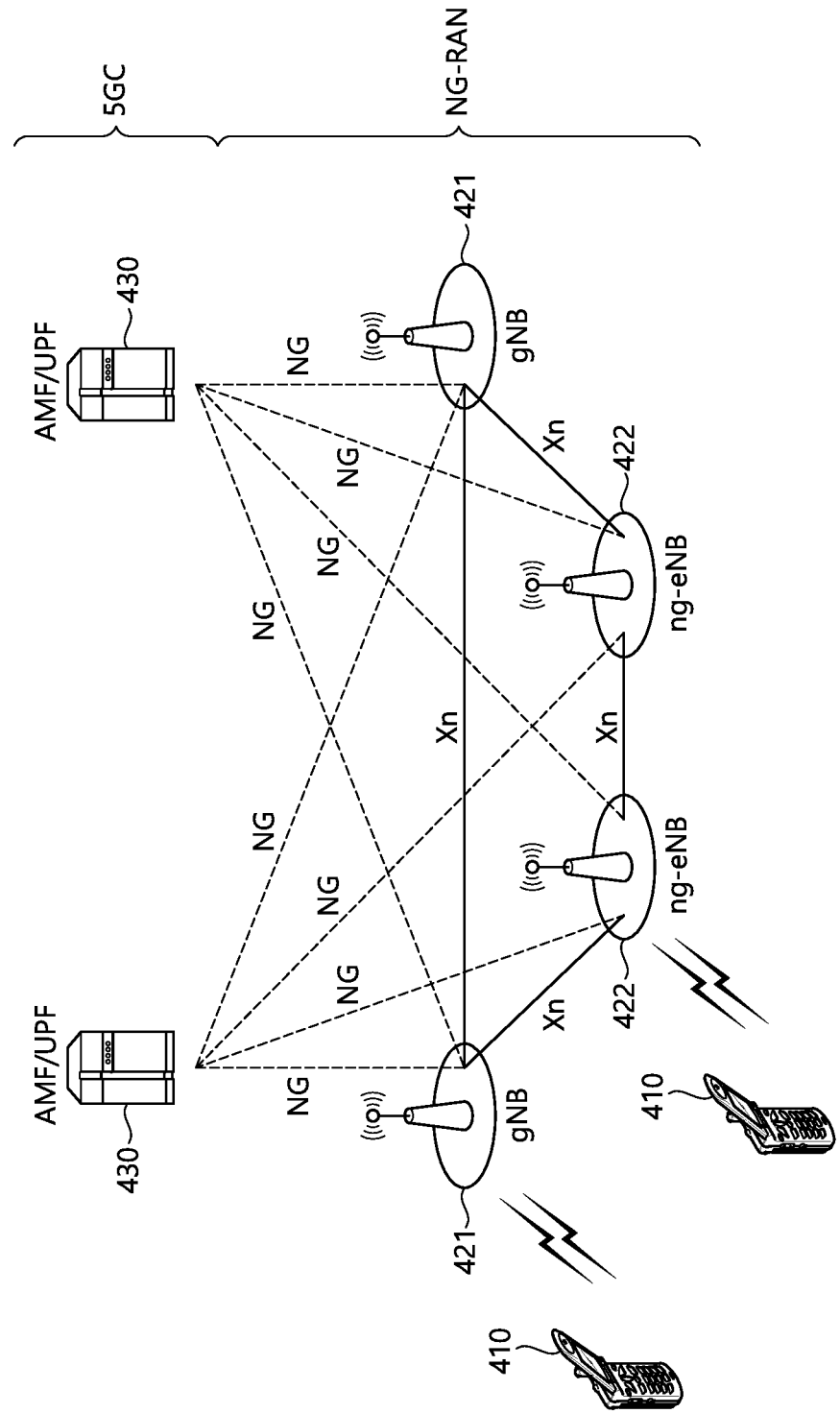
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
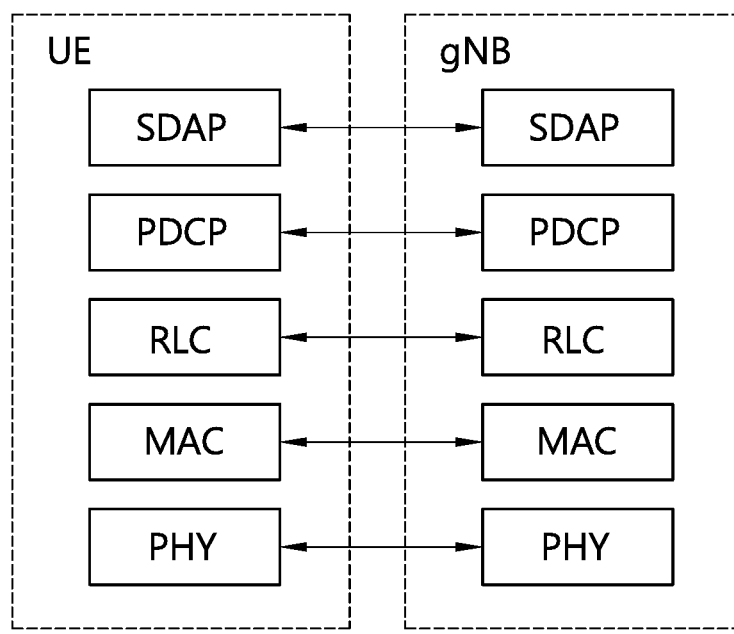
FIG. 5 shows a block diagram of a user plane protocol stack to which the technical features of the present invention can be applied.
Figure 6:
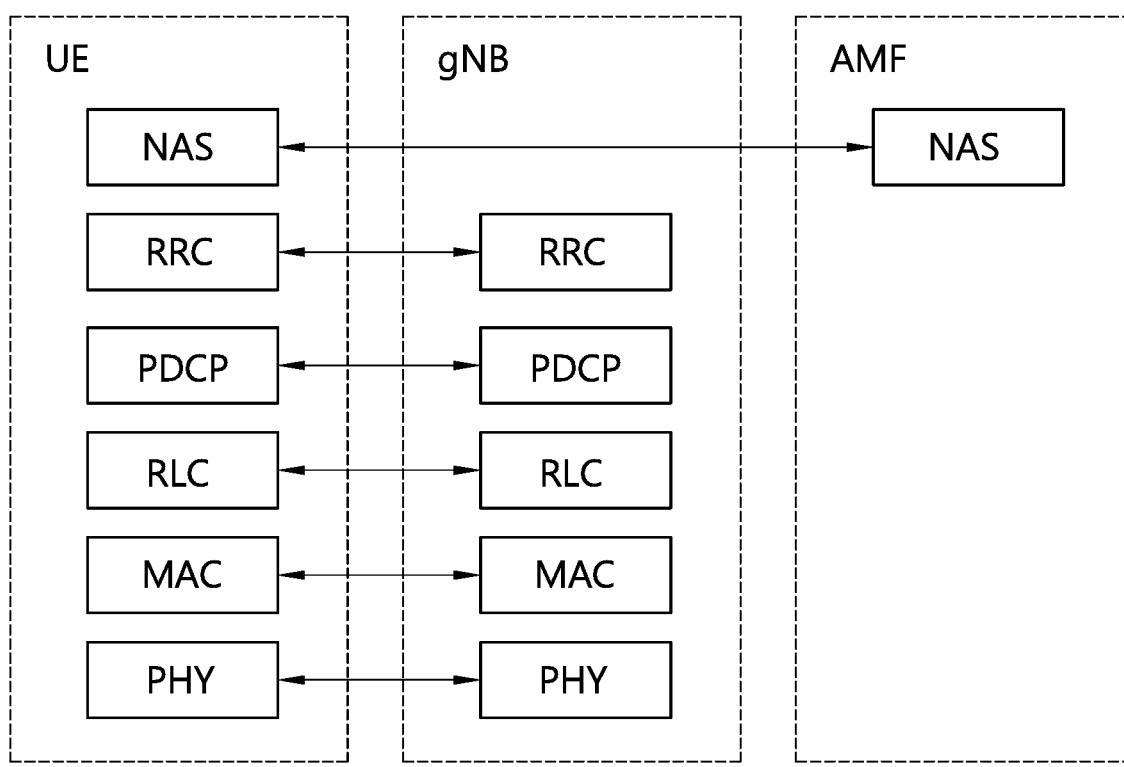
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Security handling at RRC state transitions is described. Section 6.8.2 of 3GPP TS 33.501 V15.1.0 (2018-06) may be referred.

(1) Security handling at transitions between RRC_INACTIVE and RRC_CONNECTED states In 5G, the RRC_INACTIVE state allows gNB to suspend the UE's RRC connection while the gNB and the UE continue to maintain the UE 5G AS security context. The UE RRC connection can be resumed at a later time by allowing the UE to transition into RRC_CONNECTED state. The UE may transition from RRC_INACTIVE state to RRC_CONNECTED state to the same last serving gNB which sent the UE into RRC_INACTIVE state or to a different gNB. While the UE is in RRC_INACTIVE state, the UE and last serving gNB store the UE 5G AS security context which can be reactivated when the UE transitions from RRC_INACTIVE to RRC_CONNECTED.

For state transition from RRC_CONNECTED to RRC_INACTIVE, the gNB shall send to the UE an RRC inactive message that is ciphered and integrity protected in PDCP layer using a current AS security context. The gNB shall include a fresh inactive radio network temporary identifier (I-RNTI), and a next hop chaining counter (NCC) in that RRC inactive message. The I-RNTI is used for context identification, and the UE ID part of the I-RNTI assigned by the gNB shall be different in consecutive suspends of the same UE. This is to avoid tracking of UEs based on the I-RNTI. If the gNB has a fresh and unused pair of {NCC, NH}, the gNB shall include the NCC in the RRC inactive message. Otherwise, the gNB shall include the same NCC associated with the current $K_{gNB}$ in the RRC inactive message. The NCC is used for AS security.

The gNB shall delete the current AS keys $K_{RRCint}$, $K_{RRCenc}$, $K_{UPenc}$ (if available), and $K_{UPint}$ (if available) after sending the RRC inactive message to the UE. If the sent NCC value is fresh and belongs to an unused pair of {NCC, NH}, the gNB shall save the pair of {NCC, NH} in the UE AS security context and delete the current AS key $K_{gNB}$. If the sent NCC value is equal to the NCC value associated with the current $K_{gNB}$, the gNB shall keep the current AS key $K_{gNB}$ and NCC. The gNB shall store the sent I-RNTI together with the current UE context including the remainder of the AS security context.

Upon receiving the RRC inactive message from the gNB, the UE shall verify that the integrity of the received RRC inactive message is correct by checking the PDCP MAC-I. If this verification is successful, then the UE shall take the received NCC value and save it as stored NCC with the current UE context. The UE shall delete the current AS keys $K_{RRCint}$, $K_{RRCenc}$, $K_{UPenc}$ (if available), and $K_{UPint}$ (if available). If the stored NCC value is different from the NCC value associated with the current $K_{gNB}$, the UE shall delete the current AS key $K_{gNB}$. If the stored NCC is equal to the NCC value associated with the current $K_{gNB}$, the UE shall keep the current AS key $K_{gNB}$. The UE shall store the received I-RNTI together with the current UE context including the remainder of the AS security context, for the next state transition.

When the UE decides to resume the RRC connection to transit from RRC_INACTIVE to RRC_CONNECTED, the UE shall derive a $K_{gNB}$* using the target physical cell ID (PCI), target absolute radio frequency channel number (ARFCN)-DL and the $K_{gNB}$/NH based on either a horizontal key derivation or a vertical key derivation according to the stored NCC and the NCC associated with current $K_{gNB}$ in the current UE 5G AS security context. The UE shall further derive $K_{RRCint}$, $K_{RRCenc}$, $K_{UPenc}$ (optionally), and $K_{UPint}$ (optionally) from the newly derived $K_{gNB}$*.

The UE sends RRC resume request message on SRB0 and hence it is not integrity protected. However, the RRC resume request message shall include the I-RNTI and a resume-MAC-I. The I-RNTI is used for context identification and its value shall be the same as the I-RNTI that the UE had received from the source gNB in the RRC inactive message. The resumeMAC-I is a 16-bit message authentication token, the UE shall calculate it using the integrity algorithm (NIA) in the stored AS security context, which was negotiated between the UE and the source gNB and the newly calculated $K_{RRCint}$ with the following inputs:

KEY: it shall be set to newly derived $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input following inputs: source C-RNTI, source PCI, resume constant, target Cell-ID.

The target gNB extracts the I-RNTI from the RRC resume request message. The target gNB contacts the source gNB based on the information in the I-RNTI by sending an Xn-AP retrieve UE context request message with the following included: I-RNTI, the resumeMAC-I and target cell ID, in order to allow the source gNB to validate the UE request and to retrieve the UE context including the UE 5G AS security context.

The source gNB retrieves the stored UE context including the UE 5G AS security context from its database using the I-RNTI. The source gNB calculates $K_{gNB}$* using the target cell PCI, target ARFCN-DL and the $K_{gNB}$/NH in the current UE 5G AS security context based on either a horizontal key derivation or a vertical key derivation according to whether the source gNB has an unused pair of {NCC, NH}. The source gNB can obtain the target PCI and target ARFCN-DL from a cell configuration database by means of the target Cell ID which was received from the target gNB. In addition, the source gNB shall derive the $K_{RRCint}$ based on calculated $K_{gNB}$*, and verify the resumeMAC-I (calculating it in the same way as described above). If the verification of the resumeMAC-I is successful, the source gNB shall respond with an Xn-AP retrieve UE context response message to the target gNB including the UE context that contains the UE 5G AS security context. The UE 5G AS security context sent to the target gNB shall include the new derived $K_{gNB}$*, the NCC associated to the $K_{gNB}$*, the UE 5G security capabilities, and the ciphering and integrity algorithms used by the UE with the source cell.

The target gNB shall check if it supports the ciphering and integrity algorithms the UE used with the last source cell. If the target gNB does not support the ciphering and integrity algorithms used in the last source cell or if the target gNB prefers to use different algorithms than the source gNB, then the target gNB shall send an RRC setup message on SRB0 to the UE in order to proceed with RRC connection establishment as if the UE was in RRC_IDLE (i.e. a fallback procedure).

If the target gNB supports the ciphering and integrity algorithms used with the last source cell and these algorithms are the chosen algorithms by the target gNB, the target gNB shall derive new AS keys (RRC integrity key, RRC encryption key and UP keys) using the algorithms the UE used with the source cell and the received $K_{gNB}$*. The target gNB shall reset all PDCP COUNTs to 0 and activate the new keys in PDCP layer. The target gNB shall respond to the UE with an RRC resume message on SRB1 which is integrity protected and ciphered in PDCP layer using the new RRC keys. When the UE receives the RRC resume message, the UE shall decrypt the message using the $K_{RRCenc}$ that was derived based on $K_{gNB}$* that was used to calculate the resumeMAC-I of the RRC resume request message. The UE shall also verify the RRC resume message by verifying the PDCP MAC-I using the $K_{RRCint}$ that was used to calculate the resumeMAC-I. The UE shall send the RRC resume complete message both integrity protected and ciphered to the target gNB on SRB1 using the current $K_{RRCint}$ and $K_{RRCenc}$.

When UE receives RRC connection reject message from the target gNB, the UE shall delete derived AS keys used for connection resumption attempt, including $K_{gNB}$*, derived new RRC integrity key, RRC encryption key and UP keys, and keep $K_{gNB}$/NH in its current AS context.

Security is fully resumed on UE side after reception and processing of RRC resume message. The UE can receive data on DRB(s) after having received and processed RRC resume message. UL data on DRB(s) can be sent after RRC resume complete message has been successfully sent.

After a successful transition from RRC_INACTIVE to RRC_CONNECTED, the target gNB shall perform path switch procedure with the AMF.

For state transition from RRC_INACTIVE to RRC_CONNECTED to the same gNB, the target gNB may be the same as the source gNB in the previous description. If so, the single gNB performs the roles of both the source and target gNB.

(2) Key Handling During Mobility in RRC_INACTIVE State

The purpose of this procedure is to allow the UE to notify the network if it moves out of the configured RNA or if UE initiates a periodic RAN-based notification area update procedure. The UE and gNB store the AS security context in RRC_INACTIVE state and reactivate the AS security context when the UE initiates the RNA update (RNAU) procedure.

When the UE decides to initiate the RNAU procedure, the UE may initiate the procedure with a new gNB. In this case, the UE, the target gNB and the source gNB follow the detailed procedure as described above for state transition from RRC_INACTIVE to RRC_CONNECTED to a new gNB with the following deviations.

The target gNB shall check if it supports the ciphering and integrity algorithms the UE used with the last source cell. If the target gNB does not support the ciphering and integrity algorithms used in the last source cell or if the target gNB prefers to use different algorithms than the source gNB, then the target gNB shall send an RRC setup message on SRB0 to the UE in order to proceed with RRC connection establishment as if the UE was in RRC_IDLE (fallback procedure).

If the target gNB selects the ciphering and integrity protection algorithms which the UE used with the last source cell and the target gNB decides to send the UE directly back to RRC_INACTIVE state without bringing the UE to RRC_CONNECTED state, the target gNB shall perform a path switch procedure with the AMF to get a fresh {NCC, NH} pair before sending the RRC inactive message to the UE. After the target gNB receives a fresh {NCC, NH} pair in the path switch acknowledgement message from the AMF, the target gNB shall set the value of NCC in the RRC inactive message to the NCC value of the received fresh {NCC, NH} pair.

When the UE decides to initiate a periodic RANU procedure, the target gNB may be same as the source gNB. If so the single gNB performs the roles of both the source gNB and the target gNB.

Table 1 shows an example of RRC resume request (RRCResumeRequest) message. The RRCResumeRequest message is used to request the resumption of a suspended RRC connection or perform an RNA update.

TABLE 1

```
-- ASN1START
-- TAG-RRCRESUMEREQUEST-START
RRCResumeRequest ::=    SEQUENCE {
      rrcResumeRequest        RRCResumeRequest-IEs
}
RRCResumeRequest-IEs ::=       SEQUENCE {
   resumeIdentity               CHOICE {
      i-RNTI-Value                I-RNTI-Value,
      truncated-i-RNTI            BIT STRING (SIZE (24))
   },
   resumeMAC-I                  BIT STRING (SIZE (16)),
   resumeCause                  ResumeCause
}
ResumeCause ::= ENUMERATED {
         emergency, highPriorityAccess, mt-Access, mo-Signalling,
         mo-Data, mo-VoiceCall, rna-Update, spare1, spare2, spare3, spare4,
         spare5, spare6, spare7, spare8, spare9 }
-- TAG-RRCRESUMEREQUEST-STOP
-- ASN1STOP
```

Referring to Table 1, the resumeMAC-I field indicates authentication token to facilitate UE authentication at gNB.

Table 2 shows an example of VarResumeMAC-Input. The UE variable VarResumeMAC-Input specifies the input used to generate the resumeMAC-I during RRC connection resume procedure.

TABLE 2

```
-- ASN1START
-- TAG-VAR-RESUMEMACINPUT-START
VarResumeMAC-Input ::=   SEQUENCE {
   sourcePhysCellId         PhysCellId,
   targetCellIdentity       CellIdentity,
   source-c-RNTI            RNTI-Value,
   resumeDiscriminator      BIT STRING(SIZE(1))
}
-- TAG-VAR-RESUMEMACINPUT-STOP
-- ASN1STOP
```

Referring to Table 2, The UE variable VarResumeMAC-Input consists of the sourcePhysCellId field, the targetCellIdentity field and the source-c-RNTI field. The source-c-RNTI field is set to the PCI of the primary cell (PCell) the UE was connected to prior to suspension of the RRC connection. The targetCellIdentity field is set to cell ID of the target cell i.e. the cell the UE is trying to resume. The source-c-RNTI field is set to C-RNTI that the UE had in the PCell it was connected to prior to suspension of the RRC connection.

It has been agreed that any RRC message which contains a new I-RNTI is to be ciphered and integrity protected. According to the above description, the RRC resume request message includes the I-RNTI and a resumeMAC-I. The I-RNTI may be exposed in RRC resume request message. The I-RNTI may not be updated if the UE is responded with the RRC reject message (i.e. if the RRC resume procedure is not successful). In other words, when the RRC resume procedure is not successful upon which the RRC reject message is received, the UE in RRC_INACTIVE will return back to RRC_INACTIVE with exposed and not updated I-RNTI. The exposed and not updated I-RNTI is still valid for the UE in RRC_INACTIVE and the UE may transmit the RRC resume request message including the exposed and not updated I-RNTI. It means that I-RNTI is not ciphered and integrity protected, which is the opposite of the above agreement.

Figure 7:
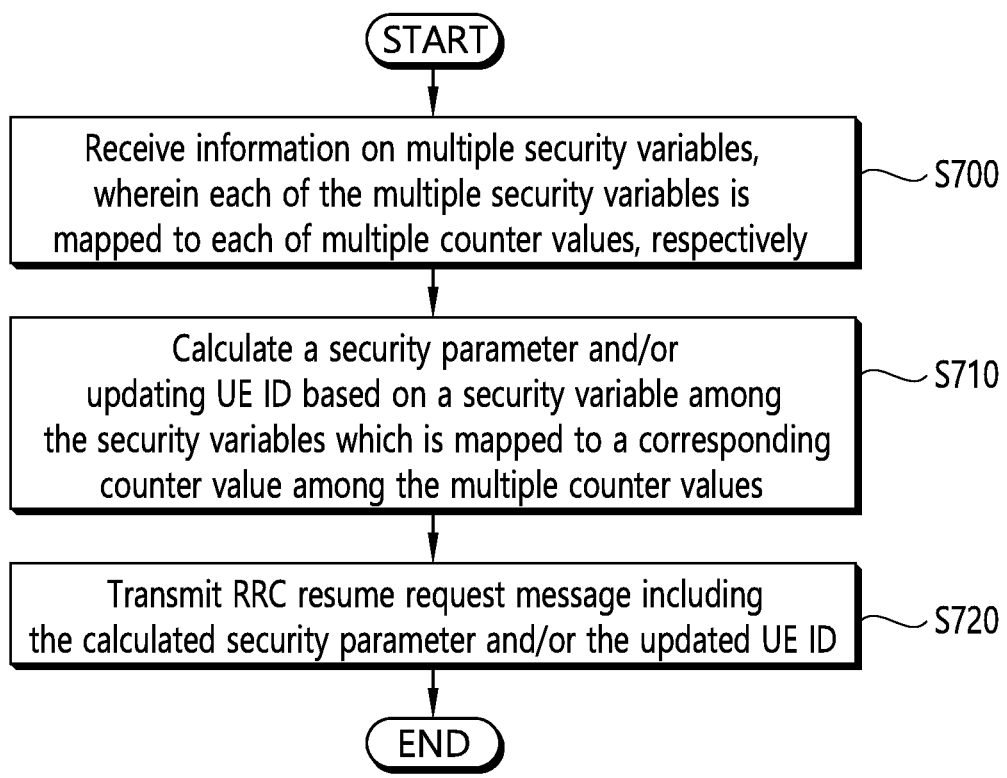
FIG. 7 shows an example of a method for supporting security in RRC_INACTIVE according to an embodiment of the present invention.

FIG. 7 shows an example of a method for supporting security in RRC_INACTIVE according to an embodiment of the present invention.

In step S700, the UE receives information on multiple security variables from a network. Each of the multiple security variables is mapped to each of multiple counter values, respectively. In step S710, the UE calculates a security parameter and/or updating UE ID based on a security variable among the security variables which is mapped to a counter value among the multiple counter values. In step S720, the UE transmits RRC resume request message including the calculated security parameter and/or the updated UE ID to the network.

Security of the RRC resume request message may be guaranteed based on a timer. In detail, the UE may further receive a timer value for a timer from the network. The timer value for the timer may be received together with the information on multiple security variables. Upon receiving the time value for the timer, the UE starts the timer with the timer value. Whenever the times expires, the counter value may be increased by 1 and the timer may be restarted. That is, the UE determines a security variable mapped to the counter value at a time point when the UE initiates transmission of the RRC resume request message, and the UE calculates the security parameter and/or updates UE ID based on the determined security variable. The timer may stop when the UE enters an RRC connected state by receiving an RRC resume message or RRC setup message or receives an RRC release message. When the counter value reaches a number of the multiple counter values, the UE may enter to an RRC idle state, and perform NAS signaling connection recovery procedure.

Alternatively, security of the RRC resume request message may be guaranteed based on a number of trials of RRC connection resume procedure. In detail, the UE may further receive information on a maximum number of trials of transmitting the RRC resume request message from the network. The information on a maximum number of trials may be received together with the information on multiple security variables. Whenever an RRC reject message is received from network as a response to the RRC resume request message, the counter value may be increased by 1. That is, the UE determines a security variable mapped to the counter value based on a number of trials of transmitting the RRC resume request message, and the UE calculates the security parameter and/or updates UE ID based on the determined security variable. When the counter value reaches the maximum number of trials, the UE may enter to an RRC idle state, and perform NAS signaling connection recovery procedure.

The information on multiple security variables may be received via an RRC release message with a suspend configuration, upon which the UE enters an RRC inactive state. The security variable may be a new variable for calculating the security parameter other than a source PCI, a target cell ID and a C-RNTI of the UE. The security parameter may be resumeMAC-I. The UE ID may be a part of I-RNTI.

In this embodiment, the anchor gNB which has suspended UE's RRC connection (i.e. a gNB transmitting information on multiple security variables) and the target gNB to which the UE send RRC resume request message may be different. Furthermore, the timer based solution described above may be applied generally in case that the resumeMAC-I is periodically changed based on timer when the UE is in RRC_INACTIVE.

According to the embodiment of the present invention shown in FIG. 7, the resumeMAC-I and/or I-RNTI included in the RRC resume request can be updated as time goes by or the number of trials of the RRC connection resume procedure increases. Consequently, even though the resumeMAC-I and/or I-RNTI are exposed, security of the RRC resume request message can be guaranteed by various options (i.e. timer based or number of trails of the RRC connection resume procedure).

Detailed example of each option for security of the RRC resume request message, i.e. 1) timer based solution, and 2) a number of trials of RRC connection resume procedure based solution are described in detail.

1. Option 1: Timer based solution

In this option, the resumeMAC-ID and/or UE ID part of the I-RNTI may be updated/refreshed based on timer. Detailed operations of UE and network may be as follows.

(1) UE Operation

Step 1: The UE receives an RRC inactive message or an RRC release message with a suspend configuration from the network, upon which the UE enters RRC_INACTIVE. The RRC inactive message or RRC release message with suspend configuration includes information on existing set of variables for calculating the resumeMAC-I, i.e. source PCI, target cell ID and C-RNTI of the UE. The RRC inactive message or RRC release message with the suspend indication further includes information on additional new variable for calculating the resumeMAC-I and information on a timer value Y. The additional new variable for calculating the resumeMAC-I may be array of values, e.g. {X(i) which is an integer value: X(1), X(2), X(3), . . . }.

Step 2: Upon receiving information on the new variable array {X(i)} and the timer value Y, the UE sets timer T3ab with the timer value Y and starts the timer T3ab. Additionally, the UE sets counter value Z to 0.

a) The UE may stop the timer T3ab and remove existing variables if the UE either 1) enters RRC_CONNECTED by receiving RRC resume message or RRC setup message, or 2) receives RRC release message with or without suspend configuration.

b) Upon expiry of the timer T3ab, counter value Z is increased by 1 and X(Z) in the new variable array {X(i)} is used/selected/determined for new additional input value to calculate new resumeMAC-I. The new resumeMAC-I will be included in the next/new RRC resume request message when the UE initiate RRC resume procedure. Whenever the timer T3ab expires, counter value Z is increased by 1 and the corresponding X(Z) is used/selected/determined for new additional input value to calculate new resumeMAC-I.

c) If counter value Z becomes greater than the length of the new variable array (i.e. all variable have been used for input value to calculate new resumeMAC-I), then the UE may set counter value Z to 0 and then perform the above step described in b) again. Or, the UE may enter RRC_IDLE and inform upper layer (i.e. NAS layer) that AS layer enters RRC_IDLE. Then, the NAS layer may perform NAS signaling connection recovery procedure (i.e. registration procedure).

For step c), indication on which action will be performed if counter value Z becomes greater than the length of the new variable array may be provided by the network. The indication may be provided via dedicated signaling or broadcast signaling. The indication may be provided in step 1 described above. Upon receiving the indication, if counter value Z becomes greater than the length of the new variable array, the UE may select and perform corresponding action according to the indication.

Step 3: the UE calculates the resumeMAC-I and/or updates UE ID part in the I-RNTI based on a new variable X(Z) which is mapped to the corresponding counter value Z. The UE transmits the RRC resume request message including the calculated resumeMAC-I and/or I-RNTI including the updated UE ID part to the network.

(2) Network Operation

Step 1: The network transmits an RRC inactive message or an RRC release message with a suspend configuration to the UE, upon which the UE enters RRC_INACTIVE. The RRC inactive message or RRC release message with the suspend configuration includes information on existing set of variables for calculating the resumeMAC-I, i.e. source PCI, target cell ID and C-RNTI of the UE. The RRC inactive message or RRC release message with the suspend indication further includes information on additional new variable for calculating the resumeMAC-I and information on a timer value Y. The additional new variable for calculating the resumeMAC-I may be array of values, e.g. {X(i) which is an integer value: X(1), X(2), X(3), . . . }.

Step 2: Upon transmitting the information on the new variable array {X(i)} and the timer value Y, the network sets timer T3ab with the timer value Y and starts the timer T3ab. Additionally, the network sets counter value Z to 0.

a) The network may stop the timer T3ab and remove existing variables if the network either 1) successfully transmits RRC resume message or RRC setup message to the UE, or 2) successfully transmits RRC release message with or without suspend configuration.

b) Upon expiry of the timer T3ab, counter value Z is increased by 1 and X(Z) in the new variable array {X(i)} is used/selected/determined for new additional input value to calculate new resumeMAC-I. Whenever the timer T3ab expires, counter value Z is increased by 1 and the corresponding X(Z) is used/selected/determined for new additional input value to calculate new resumeMAC-I.

c) If counter value Z becomes greater than the length of the new variable array (i.e. all variable have been used for input value to calculate new resumeMAC-I), then the network may set counter value Z to 0 and then perform the above step described in b) again. Or, the network may make the UE enter RRC_IDLE For step c), indication on which action will be performed by the UE if counter value Z becomes greater than the length of the new variable array may be provided to the UE. The indication may be provided via dedicated signaling or broadcast signaling. The indication may be provided in step 1 described above. Upon receiving the indication, if counter value Z becomes greater than the length of the new variable array, the UE may select and perform corresponding action according to the indication.

2. Option 2: The Number of Trials of RRC Connection Resume Procedure Based Solution In this option, the resumeMAC-ID and/or UE ID part of the I-RNTI may be updated/refreshed based on the number of trials of RRC connection resume procedure. Detailed operations of UE and network may be as follows.

(1) UE Operation

Step 1: The UE receives an RRC inactive message or an RRC release message with a suspend configuration from the network, upon which the UE enters RRC_INACTIVE. The RRC inactive message or RRC release message with the suspend configuration includes information on existing set of variables for calculating the resumeMAC-I, i.e. source PCI, target cell ID and C-RNTI of the UE. The RRC inactive message or RRC release message with the suspend indication further includes information on additional new variable for calculating the resumeMAC-I and information on a maximum number of trials W of RRC connection resume procedure. The additional new variable for calculating the resumeMAC-I may be array of values, e.g. {X(i) which is an integer value: X(1), X(2), X(3), . . . }.

Step 2: Upon receiving information on the new variable array {X(i)} and the maximum number of trials W, the UE sets counter value Z to 0.

a) The UE remove existing variables if the UE either 1) enters RRC_CONNECTED by receiving RRC resume message or RRC setup message, or 2) receives RRC release message with or without suspend configuration.

b) If the UE receives an RRC reject message as a response to the RRC resume request message, counter value Z is increased by 1 and X(Z) in the new variable array {X(i)} is used/selected/determined for new additional input value to calculate new resumeMAC-I. The new resumeMAC-I will be included in the next/new RRC resume request message when the UE initiate RRC resume procedure. Whenever the UE receives an RRC reject message as a response to the RRC resume request message, counter value Z is increased by 1 and the corresponding X(Z) is used/selected/determined for new additional input value to calculate new resumeMAC-I.

c) If counter value Z becomes greater than the maximum number of trials W, then the UE may set counter value Z to 0 and then perform the above step described in b) again. Or, the UE may enter RRC_IDLE and inform upper layer (i.e. NAS layer) that AS layer enters RRC_IDLE. Then, the NAS layer may perform NAS signaling connection recovery procedure (i.e. registration procedure).

For step c), indication on which action will be performed if counter value Z becomes greater than the maximum number of trials W may be provided by the network. The indication may be provided via dedicated signaling or broadcast signaling. The indication may be provided in step 1 described above. Upon receiving the indication, if counter value Z becomes greater than the maximum number of trials W, the UE may select and perform corresponding action according to the indication.

(2) Network Operation

Step 1: The network transmits an RRC inactive message or an RRC release message with a suspend configuration to the UE, upon which the UE enters RRC_INACTIVE. The RRC inactive message or RRC release message with the suspend configuration includes information on existing set of variables for calculating the resumeMAC-I, i.e. source PCI, target cell ID and C-RNTI of the UE. The RRC inactive message or RRC release message with the suspend indication further includes information on additional new variable for calculating the resumeMAC-I and information on a maximum number of trials W of RRC connection resume procedure. The additional new variable for calculating the resumeMAC-I may be array of values, e.g. {X(i) which is an integer value: X(1), X(2), X(3), . . . }.

Step 2: Upon transmitting the information on the new variable array {X(i)} and the maximum number of trials W, the network sets counter value Z to 0.

a) The network may remove existing variables if the network either 1) successfully transmits RRC resume message or RRC setup message to the UE, or 2) successfully transmits RRC release message with or without suspend configuration.

b) If the network transmits an RRC reject message as a response to the RRC resume request message, counter value Z is increased by 1 and X(Z) in the new variable array {X(i)} is used/selected/determined for new additional input value to calculate new resumeMAC-I. Whenever the network transmits an RRC reject message as a response to the RRC resume request message, counter value Z is increased by 1 and the corresponding X(Z) is used/selected/determined for new additional input value to calculate new resumeMAC-I.

c) If counter value Z becomes greater than the maximum number of trials W, then the network may set counter value Z to 0 and then perform the above step described in b) again. Or, the network may make the UE enter RRC_IDLE For step c), indication on which action will be performed by the UE if counter value Z becomes greater than the maximum number of trials W may be provided to the UE. The indication may be provided via dedicated signaling or broadcast signaling. The indication may be provided in step 1 described above. Upon receiving the indication, if counter value Z becomes greater than the maximum number of trials W, the UE may select and perform corresponding action according to the indication.

In the descriptions above, the network may mean an anchor gNB which has suspended the UE' RRC connection. Or, the anchor gNB which has suspended the UE's RRC connection and the target gNB which the UE send the RRC resume request message may be different from each other. When the anchor gNB and the target gNB are different from each other, to support network operation of option 2 described above, the anchor gNB should know whether the UE transmits the RRC resume request message but the target gNB responds with the RRC reject message. For that, at least one of the followings may be considered The target gNB may inform the anchor gNB whenever the target gNB transmits the RRC reject message; or When the UE initiates RRC connection resume procedure, the counter value Z may be included in the RRC resume request message. Upon receiving the counter value Z via the RRC resume request message, the target gNB forward the counter value Z to the anchor gNB even if the target gNB rejects the RRC resume request message.

As mentioned above, the I-RNTI (specifically, UE ID part in the I-RNTI) may also be updated based on option 1 or option 2. In this case, array of values, e.g. {X(i) which is an integer value: X(1), X(2), X(3), . . . } describe above may be a value for UE ID part in the I-RNTI.

Option 1 may be applied to not only RRC reject case for RRC resume request message, but also general situation in which the resumeMAC-I is periodically changed based on timer when the UE is in RRC_INACTIVE.

Figure 8:
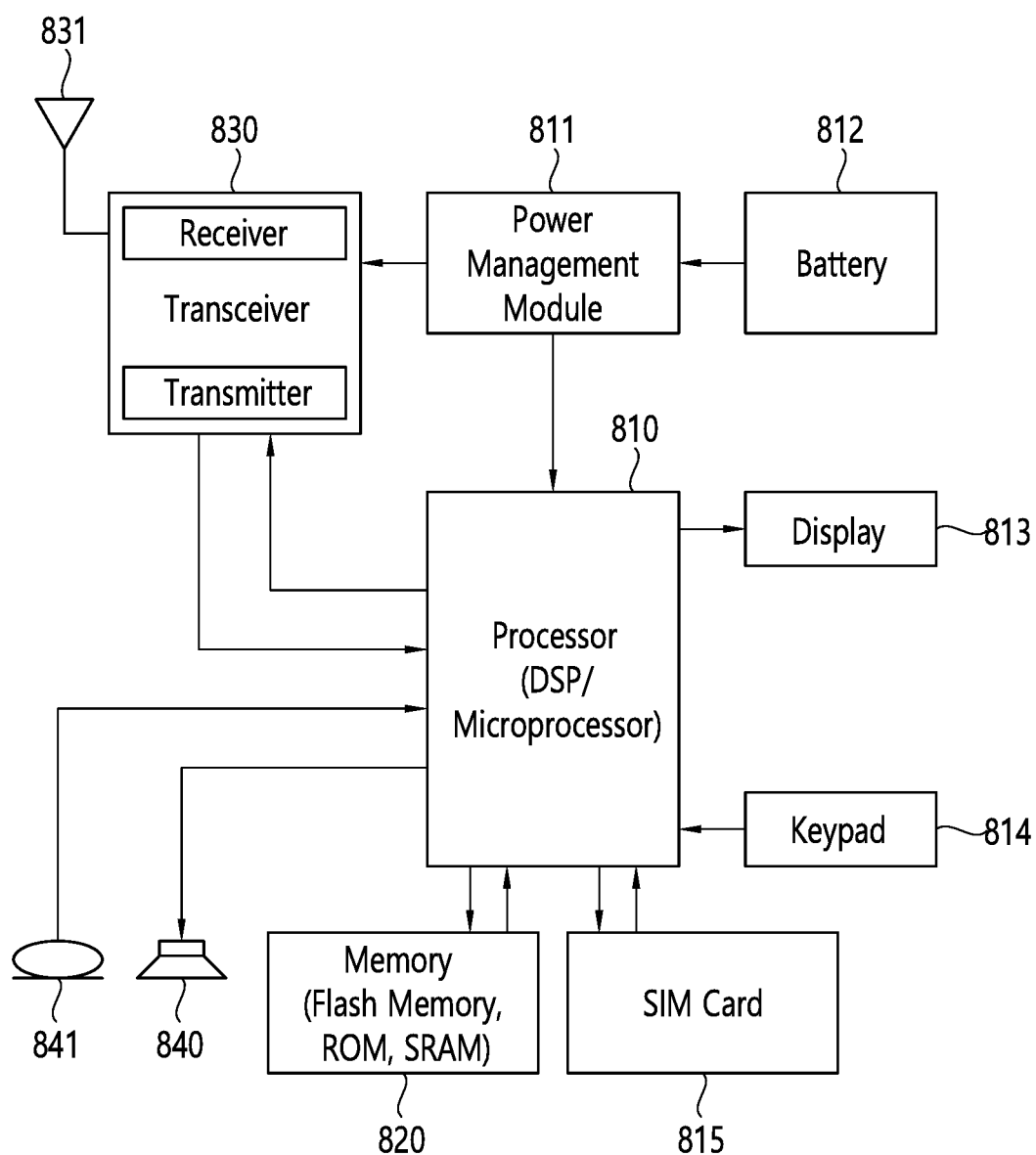
FIG. 8 shows a UE to which the technical features of the present invention can be applied.

FIG. 8 shows a UE to which the technical features of the present invention can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement proposed functions, procedures and/or methods described in this description. Layers of the radio interface protocol may be implemented in the processor 810. The processor 810 may include application-specific integrated circuit (ASIC), other chipset, logic circuit and/or data processing device. The processor 810 may be an application processor (AP). The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 810 is configured to control the transceiver 830 to receive information on multiple security variables from a network. Each of the multiple security variables is mapped to each of multiple counter values, respectively. The processor 810 is configured to calculate a security parameter and/or updating UE ID based on a security variable among the security variables which is mapped to a counter value among the multiple counter values. The processor 810 is configured to control the transceiver 830 to transmit RRC resume request message including the calculated security parameter and/or the updated UE ID to the network.

Security of the RRC resume request message may be guaranteed based on a timer. In detail, the processor 810 may be configured to control the transceiver 830 to receive a time value for a timer from the network. The timer value for the timer may be received together with the information on multiple security variables. Upon receiving the timer value for the timer, the processor 810 may be configured to start the timer with the timer value. Whenever the times expires, the counter value may be increased by 1 and the timer may be restarted. That is, the processor 810 may be configured to determine a security variable mapped to the counter value at a time point when the UE initiates transmission of the RRC resume request message, and calculate the security parameter and/or updates UE ID based on the determined security variable. The timer may stop when the UE enters an RRC connected state by receiving an RRC resume message or RRC setup message or receives an RRC release message. When the counter value reaches a number of the multiple counter values, the UE may enter to an RRC idle state, and the processor 810 may be configured to perform NAS signaling connection recovery procedure.

Alternatively, security of the RRC resume request message may be guaranteed based on a number of trials of RRC connection resume procedure. In detail, the processor 810 may be configured to control the transceiver 830 to receive information on a maximum number of trials of transmitting the RRC resume request message from the network. The information on a maximum number of trials may be received together with the information on multiple security variables. Whenever an RRC reject message is received from network as a response to the RRC resume request message, the counter value may be increased by 1. That is, the processor 810 may be configured to determine a security variable mapped to the counter value based on a number of trials of transmitting the RRC resume request message, and calculate the security parameter and/or updates UE ID based on the determined security variable. When the counter value reaches the maximum number of trials, the UE may enter to an RRC idle state, and the processor 810 may be configured to perform NAS signaling connection recovery procedure.

The information on multiple security variables may be received via an RRC release message with a suspend configuration, upon which the UE enters an RRC inactive state. The security variable may be a new variable for calculating the security parameter other than a source PCI, a target cell ID and a C-RNTI of the UE. The security parameter may be resumeMAC-I. The UE ID may be a part of I-RNTI.

In this embodiment, the anchor gNB which has suspended UE's RRC connection (i.e. a gNB transmitting information on multiple security variables) and the target gNB to which the UE send RRC resume request message may be different. Furthermore, the timer based solution described above may be applied generally in case that the resumeMAC-I is periodically changed based on timer when the UE is in RRC_INACTIVE.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

According to the embodiment of the present invention shown in FIG. 8, the resumeMAC-I and/or I-RNTI included in the RRC resume request can be updated as time goes by or the number of trials of the RRC connection resume procedure increases. Consequently, even though the resumeMAC-I and/or I-RNTI are exposed, security of the RRC resume request message can be guaranteed by various options (i.e. timer based or number of trails of the RRC connection resume procedure).

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 9:
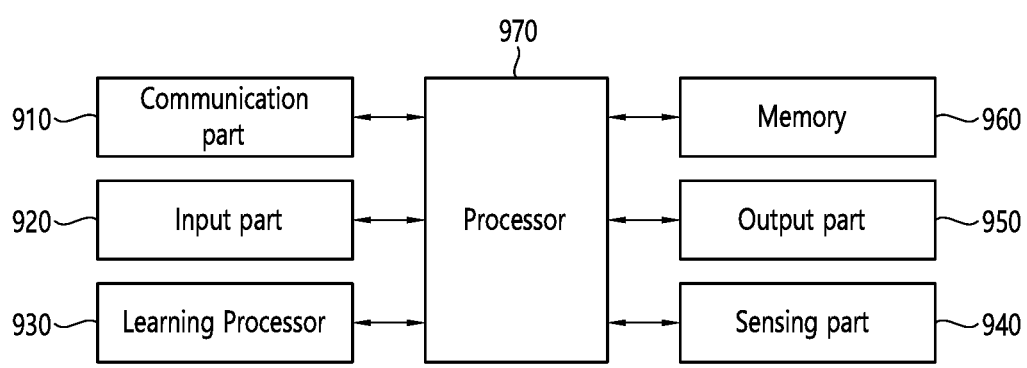
FIG. 9 shows an example of an AI device to which the technical features of the present invention can be applied.

FIG. 9 shows an example of an AI device to which the technical features of the present invention can be applied.

The AI device 900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 9, the AI device 900 may include a communication part 910, an input part 920, a learning processor 930, a sensing part 940, an output part 950, a memory 960, and a processor 970.

The communication part 910 can transmit and/or receive data to and/or from external devices such as the AI devices and the AI server using wire and/or wireless communication technology. For example, the communication part 910 can transmit and/or receive sensor information, a user input, a learning model, and a control signal with external devices. The communication technology used by the communication part 910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 920 can acquire various kinds of data. The input part 920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 920 can acquire input data to be used when acquiring an output using learning data and a learning model for model learning. The input part 920 may obtain raw input data, in which case the processor 970 or the learning processor 930 may extract input features by preprocessing the input data.

The learning processor 930 may learn a model composed of an ANN using learning data. The learned ANN can be referred to as a learning model. The learning model can be used to infer result values for new input data rather than learning data, and the inferred values can be used as a basis for determining which actions to perform. The learning processor 930 may perform AI processing together with the learning processor of the AI server. The learning processor 930 may include a memory integrated and/or implemented in the AI device 900. Alternatively, the learning processor 930 may be implemented using the memory 960, an external memory directly coupled to the AI device 900, and/or a memory maintained in an external device.

The sensing part 940 may acquire at least one of internal information of the AI device 900, environment information of the AI device 900, and/or the user information using various sensors. The sensors included in the sensing part 940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 950 may generate an output related to visual, auditory, tactile, etc. The output part 950 may include a display unit for outputting visual information, a speaker for outputting auditory information, and/or a haptic module for outputting tactile information.

The memory 960 may store data that supports various functions of the AI device 900. For example, the memory 960 may store input data acquired by the input part 920, learning data, a learning model, a learning history, etc.

The processor 970 may determine at least one executable operation of the AI device 900 based on information determined and/or generated using a data analysis algorithm and/or a machine learning algorithm. The processor 970 may then control the components of the AI device 900 to perform the determined operation. The processor 970 may request, retrieve, receive, and/or utilize data in the learning processor 930 and/or the memory 960, and may control the components of the AI device 900 to execute the predicted operation and/or the operation determined to be desirable among the at least one executable operation. The processor 970 may generate a control signal for controlling the external device, and may transmit the generated control signal to the external device, when the external device needs to be linked to perform the determined operation. The processor 970 may obtain the intention information for the user input and determine the user's requirements based on the obtained intention information. The processor 970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 930 and/or learned by the learning processor of the AI server, and/or learned by their distributed processing. The processor 970 may collect history information including the operation contents of the AI device 900 and/or the user's feedback on the operation, etc. The processor 970 may store the collected history information in the memory 960 and/or the learning processor 930, and/or transmit to an external device such as the AI server. The collected history information can be used to update the learning model. The processor 970 may control at least some of the components of AI device 900 to drive an application program stored in memory 960. Furthermore, the processor 970 may operate two or more of the components included in the AI device 900 in combination with each other for driving the application program.

Figure 10:
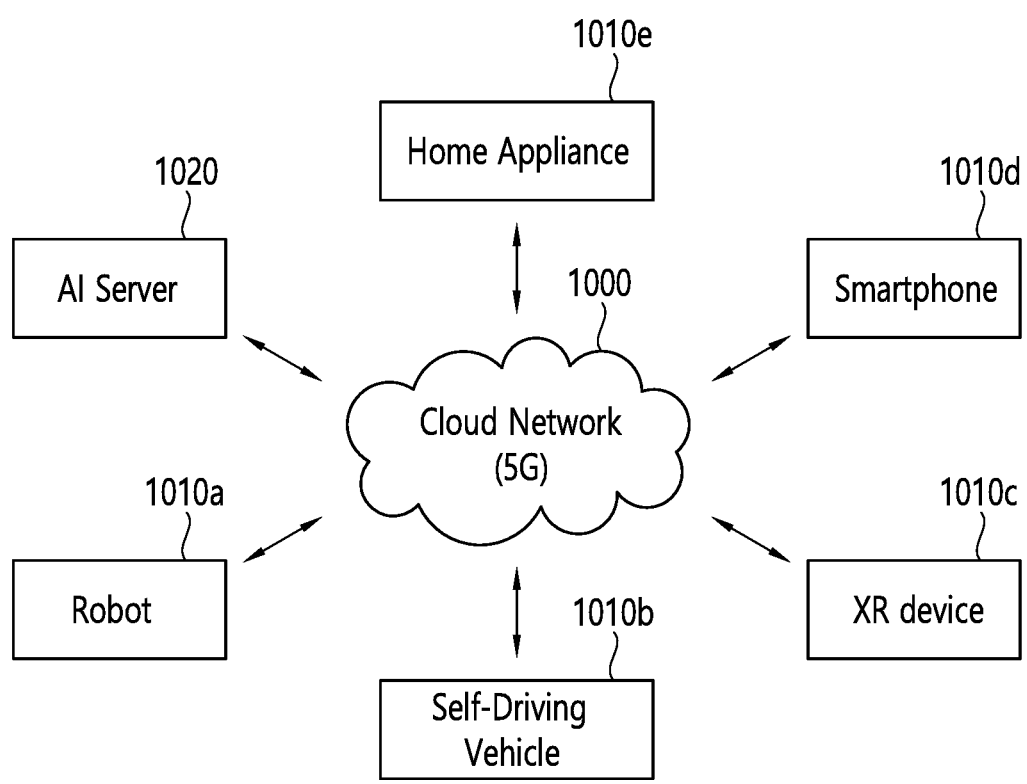
FIG. 10 shows an example of an AI system to which the technical features of the present invention can be applied.

FIG. 10 shows an example of an AI system to which the technical features of the present invention can be applied.

Referring to FIG. 10, in the AI system, at least one of an AI server 1020, a robot 1010a, an autonomous vehicle 1010b, an XR device 1010c, a smartphone 1010d and/or a home appliance 1010e is connected to a cloud network 1000. The robot 1010a, the autonomous vehicle 1010b, the XR device 1010c, the smartphone 1010d, and/or the home appliance 1010e to which the AI technology is applied may be referred to as AI devices 1010a to 1010e.

The cloud network 1000 may refer to a network that forms part of a cloud computing infrastructure and/or resides in a cloud computing infrastructure. The cloud network 1000 may be configured using a 3G network, a 4G or LTE network, and/or a 5G network. That is, each of the devices 1010a to 1010e and 1020 consisting the AI system may be connected to each other through the cloud network 1000. In particular, each of the devices 1010a to 1010e and 1020 may communicate with each other through a base station, but may directly communicate with each other without using a base station.

The AI server 1000 may include a server for performing AI processing and a server for performing operations on big data. The AI server 1000 is connected to at least one or more of AI devices constituting the AI system, i.e. the robot 1010a, the autonomous vehicle 1010b, the XR device 1010c, the smartphone 1010d and/or the home appliance 1010e through the cloud network 1000, and may assist at least some AI processing of the connected AI devices 1010a to 1010e. The AI server 1000 can learn the ANN according to the machine learning algorithm on behalf of the AI devices 1010a to 1010e, and can directly store the learning models and/or transmit them to the AI devices 1010a to 1010e. The AI server 1000 may receive the input data from the AI devices 1010a to 1010e, infer the result value with respect to the received input data using the learning model, generate a response and/or a control command based on the inferred result value, and transmit the generated data to the AI devices 1010a to 1010e. Alternatively, the AI devices 1010a to 1010e may directly infer a result value for the input data using a learning model, and generate a response and/or a control command based on the inferred result value.

Various embodiments of the AI devices 1010a to 1010e to which the technical features of the present invention can be applied will be described. The AI devices 1010a to 1010e shown in FIG. 10 can be seen as specific embodiments of the AI device 900 shown in FIG. 9.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
   receiving, from an anchor cell, a radio resource control (RRC) release message including (i) a suspend configuration and (ii) multiple security variables,
   wherein the multiple security variables are mapped to multiple values of a security counter, respectively;
   calculating a resumeMAC-I based on (i) a Physical Cell Identifier (PCI) of the anchor cell, (ii) a Cell-Radio Network Temporary Identifier (C-RNTI) used for the anchor cell, (iii) a cell ID of a target cell, and (iv) a specific security variable selected based on a value of the security counter; and updating an inactive Radio Network Temporary Identifier (I-RNTI) of the wireless device, based on the specific security variable;

transmitting, to the target cell, an RRC resume request message including (i) the calculated resumeMAC-I and (ii) the updated I-RNTI; and increasing the security counter, based on transmitting the RRC resume request message;

based on the security counter reaching a maximum trial value:
  entering into an RRC idle state; and
  performing a connection recovery procedure through a Non-access stratum (NAS) layer of the wireless device.

2. The method of claim 1, wherein the method further comprises:
  starting a security timer, upon receiving the RRC release message; and
  increasing the security counter and restarting the security timer, whenever the security timer expires.

3. The method of claim 1, wherein information on the value of the security counter is included in the RRC resume request message.

4. The method of claim 3, wherein the information on the value of the security counter is forwarded to the anchor cell via the target cell.

5. The method of claim 1, wherein the method further comprises, based on the security counter reaching the maximum trial value, setting the security counter to zero (0).

6. The method of claim 1, wherein the method further comprises receiving information informing the wireless device whether i) to set the security counter to zero (0) or ii) to enter into an RRC idle state and performing a connection recovery procedure through a NAS layer, based on the security counter reaching the maximum trail value.

7. The method of claim 1, wherein the method further comprises increasing the security counter, whenever receiving an RRC reject message as a response to the RRC resume request message.

8. The method of claim 1, wherein the wireless device is in communication with at least one of a user equipment, a network, and/or autonomous vehicles.

9. A wireless device in a wireless communication system, the wireless device comprising:
  a memory;
  a transceiver; and
  a processor, operably coupled to the memory and the transceiver, wherein the processor is configured to:
    control the transceiver to receive, from an anchor cell, a radio resource control (RRC) release message including (i) a suspend configuration and (ii) multiple security variables,
    wherein the multiple security variables are mapped to multiple values of a security counter, respectively;
    calculate a resumeMAC-I based on (i) a Physical Cell Identifier (PCI) of the anchor cell, (ii) a Cell-Radio Network Temporary Identifier (C-RNTI) used for the anchor cell, (iii) a cell ID of a target cell, and (iv) a specific security variable selected based on a value of the security counter; and
    update an inactive Radio Network Temporary Identifier (I-RNTI) of the wireless device, based on the specific security variable;
    control the transceiver to transmit, to the target cell, an RRC resume request message including (i) the calculated resumeMAC-I and (ii) the updated I-RNTI; and
    increasing the security counter, based on transmitting the RRC resume request message;
    based on the security counter reaching a maximum trial value:
      enter into an RRC idle state; and
      perform a connection recovery procedure through a Non-access stratum (NAS) layer of the wireless device.

10. The wireless device of claim 9, wherein the processor is further configured to:
  start a security timer, upon receiving the RRC release message; and
  increase the security counter and restart the security timer, whenever the security timer expires.

11. The wireless device of claim 9, wherein information on the value of the security counter is included in the RRC resume request message.

12. The wireless device of claim 11, wherein the information on the value of the security counter is forwarded to the anchor cell via the target cell.

13. The wireless device of claim 10, wherein the processor is further configured to, based on the security counter reaching the maximum trial value, set the security counter to zero (0).

14. The wireless device of claim 10, wherein the processor is further configured to control the transceiver to receive information informing the processor whether i) to set the security counter to zero (0) or ii) to enter into an RRC idle state and perform a connection recovery procedure through a NAS layer, based on the security counter reaching the maximum trial value.

15. A processor for a wireless device in a wireless communication system, wherein the processor is configured to:
  control the wireless device to receive, from an anchor cell, a radio resource control (RRC) release message including (i) a suspend configuration and (ii) multiple security variables,
  wherein the multiple security variables are mapped to multiple values of a security counter, respectively;
  control the wireless device to calculate a resumeMAC-I based on (i) a Physical Cell Identifier (PCI) of the anchor cell, (ii) a Cell-Radio Network Temporary Identifier (C-RNTI) used for the anchor cell, (iii) a cell ID of a target cell, and (iv) a specific security variable selected based on a value of the security counter; and
  control the wireless device to update an inactive Radio Network Temporary Identifier (I-RNTI) of the wireless device, based on the specific security variable;
  control the wireless device to transmit, to the target cell, an RRC resume request message including (i) the calculated resumeMAC-I and (ii) the updated I-RNTI; and
  control the wireless device to increase the security counter, based on transmitting the RRC resume request message;
  based on the security counter reaching a maximum trial value:
    control the wireless device to enter into an RRC idle state; and
    control the wireless device to perform a connection recovery procedure through a Non-access stratum (NAS) layer of the wireless device.

* * * * *